United States Patent [19]

Nishimatsu et al.

[11] Patent Number: 4,547,419
[45] Date of Patent: Oct. 15, 1985

[54] MAGNETIC RECORDING MEDIUM

[75] Inventors: Masaharu Nishimatsu, Komoro; Toshiaki Ide; Hiroyuki Arioka, both of Saku; Yuichi Kubota, Komoro, all of Japan

[73] Assignee: TDK Corporation, Tokyo, Japan

[21] Appl. No.: 632,115

[22] Filed: Jul. 18, 1984

[30] Foreign Application Priority Data

Aug. 18, 1983 [JP] Japan .................. 58-149655

[51] Int. Cl.$^4$ .............................................. G11B 5/72
[52] U.S. Cl. ..................... 428/212; 360/134; 360/135; 360/136; 252/62.54; 427/44; 427/128; 427/131; 428/328; 428/694; 428/900
[58] Field of Search ............... 428/694, 695, 328, 900, 428/403, 405, 407, 425.9, 212; 427/132, 44, 131, 128; 360/134–136; 252/62.54

[56] References Cited

U.S. PATENT DOCUMENTS

| 4,109,046 | 8/1978 | Hammon | 428/694 |
| 4,419,406 | 12/1983 | Isobe | 428/900 |
| 4,439,486 | 3/1984 | Yamada | 428/425.9 |
| 4,451,531 | 5/1984 | Isobe | 428/329 |
| 4,455,345 | 6/1984 | Miyatuka | 428/694 |
| 4,465,737 | 8/1984 | Miyatuka | 428/695 |

Primary Examiner—Ellis P. Robinson
Attorney, Agent, or Firm—Oblon, Fisher, Spivak, McClelland & Maier

[57] ABSTRACT

A magnetic recording medium which comprises a plastic base film and a magnetic layer formed on one side of the base film and composed of a ferromagnetic alloy powder dispersed in a resin binder, characterized in that said ferromagnetic alloy powder has a surface area of at least 48 m$^2$/g measured by BET method, said magnetic layer has a coercive force of at least 1,000 Oe and a surface roughness of at most 0.08 μm, and a radiation-cured backing layer made of a radiation sensitive resin and having a surface roughness of from 0.05 to 0.6 μm is formed on the other side of the base film.

2 Claims, 4 Drawing Figures

MAGNETIC RECORDING MEDIUM

BACKGROUND OF THE INVENTION

1. Field of the Invention

The present invention relates to a magnetic recording medium, and more particularly to a high density recording medium having excellent physical and electromagnetic conversion characteristics.

2. Description of the Prior Art

As ferromagnetic powders which have been employed for magnetic recording media, there are, for instance, $\gamma$-$Fe_2O_3$, Co-containing $\gamma$-$Fe_2O_3$, $Fe_3O_4$, Co-containing $Fe_3O_4$ and $CrO_2$. However, the magnetic characteristics of these ferromagnetic powders, such as the coercive force and the maximum residual magnetic flux density, are inadequate for high density recording with high sensitivity, and they are not suitable for magnetic recording of a signal having a short recording wavelength of at most about 1 $\mu$m or for magnetic recording with a narrow track width.

As the requirements for such magnetic recording media have become to be severe, ferromagnetic powders having characteristics suitable for high density recording have been developed or proposed. As such magnetic powders, there may be mentioned metals or alloys such as Fe, Co, Fe-Co, Fe-Co-Ni and Co-Ni, or alloys of these materials with Al, Cr or Si. A magnetic recording layer employing such an alloy powder, is required to have a high coercive force and a high residual magnetic flux density for the purpose of the high density recording, and it is required to select a process for the preparation or an alloy composition so that the above-mentioned magnetic powder meets these requirements.

The present inventors have prepared magnetic recording media by employing various alloy powders, and have found that a magnetic recording medium with a noise level being sufficiently low and suitable for high density short wave recording is obtainable when the specific surface area as measured by BET method is at least 48 $m^2/g$, the coercive force of the magnetic layer is at least 1000 Oe, and the surface roughness of the magnetic layer is at most 0.08 $\mu$m as a $R_{20}$ value (an average value of 20 values) with a cut off of 0.17 mm by Talystep method. However, from a further study, it has been found that when the magnetic recording medium is wound or permitted to run e.g. as a video tape, the desired effects are not necessarily obtainable even when the magnetic layer satisfy the above-mentioned requirements, and that the properties of the rear side of the plastic film (usually polyester film) supporting the magnetic layer, have a close relationship with the physical and electric characteristics of the magnetic recording medium.

Under the circumstances, the present inventors have tried to form a backing layer to the rear side of the plastic base film. As a result, it has been found that the S/N ratio of the magnetic recording medium is affected not only by the specific surface area of the alloy powder used for the magnetic layer as measured by BET method and the surface roughness of the magnetic layer, but also by the surface roughness of the backing layer. Further, because of additional problems such as the cinching phenomenon (the loosening of the tape winding when the tape has been stopped abruptly), the abrasion or friction of the backing layer and the adhesion of the magnetic layer with the backing layer, it is impossible to obtain a magnetic recording medium having superior electromagnetic conversion characteristics, running characteristics and durability, without using a proper backing layer.

It has been found that depending upon the nature of the backing layer, tightening of the tape winding is likely to take place when the magnetic tape is wound on the reel, and the surface roughness of the backing layer is likely to be transferred to the magnetic layer, whereby the magnetic layer surface will be roughened, and the desired characteristic of the backing layer will not adequately be utilized. The present inventors have employed a thermosetting composition comprising a vinyl chloride-vinyl acetate-vinyl alcohol copolymer, a polyurethane resin and a polyisocyanate, or a thermosetting composition comprising such materials and nitrocellulose, as binder for the backing layer, whereby excellent effects have been obtained such as a decrease of the abrasion of the backing surface and the magnetic surface, a decrease of the dropouts and a decrease of the cinching phenomenon and friction. However, there is a recent trend that a plastic film such as a polyethylene terephthalate, polyethylene naphthalate, polyimide or polyamide film as a base film for the magnetic tape, tends to be as thin as about 11 $\mu$m or less, and accordingly when the tape is wound, there is an increasing tendency for tightening of the tape winding, whereby the roughness of the backing layer tends to be transferred onto the magnetic layer surface, thus leading to a decrease of the output.

SUMMARY OF THE INVENTION

Accordingly, it is an object of the present invention to provide a magnetic recording medium which is capable of producing a great output by avoiding a transfer of the roughness of the backing layer onto the magnetic layer surface.

According to the present invention, this object can be attained by providing a backing layer made of a radiation (ionizable radiation) curable resin, if necessary, with a predetermined filler dispersed therein, on the rear surface of the recording medium comprising a plastic base film with a magnetic layer having a specific surface roughness and containing the above-mentioned specific alloy magnetic powder. It has been found that in this case, the surface roughness of the backing layer is important and should be selected within a range of from 0.05 to 0.6 $\mu$m. If the surface roughness exceeds 0.6 $\mu$m, it will be impossible to avoid the above-mentioned problem of the transfer of the roughness from the backing layer to the magnetic layer surface. On the other hand, if the roughness is less than 0.05 $\mu$m, there will be a problem in the running friction or in the cinching phenomenon.

Thus, the present invention provide a magnetic recording medium which comprises a plastic base film and a magnetic layer formed on one side of the base film and composed of a ferromagnetic alloy powder dispersed in a resin binder, characterized in that said ferromagnetic alloy powder has a surface area of at least 48 $m^2/g$ as measured by BET method, said magnetic layer has a coercive force of at least 1,000 Oe and a surface roughness of at most 0.08 $\mu$m, and a radiation-cured backing layer made of a radiation sensitive resin and having a surface roughness of from 0.05 to 0.6 $\mu$m is formed on the other side of the base film.

BRIEF DESCRIPTION OF THE DRAWINGS

In the accompanying drawings.

DETAILED DESCRIPTION OF THE PREFERRED EMBODIMENTS

The magnetic layer of the magnetic recording medium of the present invention has a coercive force (Hc) of at least 1000 Oe and a surface roughness of at most 0.08 μm as an average value of 20 values ($R_{20}$ value) with a cut off of 0.17 mm by Talystep method hereinafter mentioned. The alloy magnetic powder in the magnetic layer has a specific surface area of at least 48 $m^2/g$ as measured by BET method.

The preferred range of the coercive force is from 1000 to 2000 Oe. If the coercive force exceeds this range, the magnetic head tends to be saturated at the time of recording, or it becomes difficult to erase the magnetization. The greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, if the surface roughness is small, the recording sensitivity for a short wavelength will increase.

As a magnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as $BH_4$, a fine powder obtained by coating the surface of iron oxide with a Si compound and dry-reducing the product in $H_2$ gas, or a fine powder obtained by evaporating an alloy in a low pressure argon atmosphere, and it has an axial ratio of from 1:5 to 1:10 and a residual magnetic flux density Br of from 2000 to 3000 gauss, and satisfies the above-mentioned conditions for the coercive force and the surface area.

Various binders may be employed in combination with the alloy magnetic powder to prepare magnetic coating compositions. It is usually preferred to employ a thermosetting resin binder or a radiation curable resin binder. As other additives, there may be employed a dispersant, a lubricant or an antistatic agent in accordance with the conventional method. In a case where there is a problem in the dispersibility because of the employment of the magnetic powder having a BET specific surface area of 48 $m^2/g$, a surfactant or an organic titanium coupling agent may be employed as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable resin binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is coated on a substrate such as a polyester base film and then subjected to thermosetting or radiation curing to form a magnetic layer, which is then subjected to calendering. Then, a backing layer is formed in a similar manner, and the product is subjected to calendering to obtain a recording medium having a predetermined surface roughness.

In the present invention, the backing layer formed on the rear side of the plastic base film such as a polyester base film, is made of a radiation curable resin composition.

The surface roughness of the backing layer is preferably from 0.05 to 0.6 μm. Coupled with the material of the backing layer, this surface roughness serves not only to improve the running characteristics of the tape and the abrasion resistance, but also to reduce the adhesion with the magnetic layer and the cinching phenomenon. Furthermore, it has been found that in connection with the surface roughness of the magnetic layer, the S/N ratio can be improved when the surface roughness of the backing layer is at most 0.6 μm. It has been found that when the surface roughness is less than 0.05 μm, there will be a cinching phenomenon, an adhesion and a problem in the running property.

The radiation curable resin to be used for the backing layer of the present invention, is a resin having a radiation curable double bond such as an acrylic double bond, a maleic double bond or an allyl-type double bond.

When the backing layer of the present invention is employed, the tightening of the tape winding will be minimized, and there will be no substantial possibility that the roughness of the backing layer surface will be transferred onto the magnetic layer surface. Accordingly, the electromagnetic characteristics will be improved, the adhesion will be substantially eliminated, and the cinching phenomenon will be minimized. The backing layer is tough and has a higher abrasion resistance and smaller frictional coefficient than the backing layer made of a thermosetting resin.

By using a radiation curable resin for the backing layer, it is possible to form a backing layer which is more uniform and tougher than the backing layer made of a thermosetting resin, and yet no transfer of the roughness of the backing layer surface onto the magnetic layer surface will take place, which is otherwise likely to take place during the thermosetting operation. Thus, the use of the radiation curable resin is advantageous.

Further, in the case where both the magnetic layer and the backing layer are cured by radiation, it is possible to conduct the curing continuously, and it is possible to prevent the dropouts since there is no transfer of the roughness of the backing layer surface to the magnetic layer surface. Furthermore, the radiation curing contributes to the energy conservation and the reduction of the manpower for the process, thus leading to a reduction of the costs. In addition to the reduction of the dropouts by preventing the tightening of the tape winding at the time of the thermosetting, the variation in the output in the longitudinal direction of the magnetic tape can be minimized, which is otherwise likely to be caused due to the difference in the pressure at different portions in the diametric direction of the rolled tape.

The variation in the output in the longitudinal direction of the magnetic tape, is attributable to the fact that the base film thickness has become as thin as 11 μm or less, and the hardness of the metal magnetic powder is smaller than the magnetic oxide such as γ-Fe$_2$O$_3$, whereby the surface of the magnetic layer has small hardness and is susceptible to the influence of the tightening of the tape winding. Such an influence can be overcome by the radiation cured backing layer, whereby the variation in the output or the variation in the dropouts in the diametric direction of the rolled tape can be minimized.

The radiation curable or sensitive resin to be used in the present invention, is usually a resin containing at least two unsaturated double bonds in its molecular chain, which are capable of generating radicals for crosslinking when irradiated. Such a resin may also be obtained by subjecting a thermoplastic resin to radiation sensitive modification. It should be mentioned that when a radiation sensitive (curable) resin is used as a binder for the magnetic layer, such a resin may be the same or different from the resin used for the backing layer.

The radiation sensitive modification can be conducted, for instance, by introducing into the molecule a radiation cross-linkable or polymerizable group having a radical polymerizable unsaturated double bond such as an acrylic double bond attributable to e.g. acrylic acid, methacrylic acid or their ester compounds, an allyl-type double bond attributable to e.g. diallylphthalate, or an unsaturated bond attributable to e.g. maleic acid or maleic acid derivatives. Any other radiation cross-linkable or polymerizable unsaturated double bond may likewise be employed.

Examples of the thermoplastic resins which can be modified into the radiation-sensitive resins will be given below.

(I) Vinyl Chloride Type Copolymers

There may be mentioned a vinyl chloride-vinyl acetate-vinyl alcohol copolymer, a vinyl chloride-vinyl alcohol copolymer, a vinyl chloride-vinyl alcohol-vinyl propionate copolymer, a vinyl chloride-vinyl acetate-maleic acid copolymer, a vinyl chloride-vinyl acetate-OH-terminated side chain alkyl group copolymer, such as VROH, VYNC or VYEGX, manufactured by UCC (Union Carbide Corporation, U.S.A.), and a maleic acid modified VERR also manufactured by UCC.

These copolymers can be modified to radiation-sensitive resins by introducing into them acrylic double bonds, maleic double bonds or allyl-type double bonds by the process described later.

(II) Unsaturated Polyester Resins

There may be mentioned saturated polyester resins obtained by the esterification of saturated polybasic acids such as phthalic acid, isophthalic acid, terephthalic acid, maleic acid, maleic acid derivatives, succinic acid, adipic acid or sebacic acid, with polyhydric alcohols such as ethylene glycol, diethylene glycol, glycerol, trimethylol propane, 1,2-propylene glycol, 1,3-butanediol, dipropylene glycol, 1,4-butanediol, 1,6-hexanediol, pentaerythritol, sorbitol, glycerin, neopentyl glycol or 1,4-cyclohexane dimethanol, and resins obtained by the modification of these polyester resins with e.g. SO$_3$Na (e.g. Vylon 53S).

These resins can be modified to radiation-sensitive resins by the process mentioned hereinafter.

(III) Unsaturated Polyester Resins

There may be mentioned polyester compounds containing radiation-curable unsaturated double bonds in the molecular chains, such as unsaturated polyester resins, prepolymers, and oligomers containing radiation curable unsaturated double bonds, which correspond to the saturated polyester resins prepared by the esterification of polybasic acids with polyhydric alcohols as referred to as the thermoplastic resins in the above (II) with the exception that a part of the polybasic acid has been replaced by maleic acid.

Examples of the polybasic acids and polyhydric alcohols for the saturated polyester resins include those compounds as enumerated in the above (I), and examples of the radiation-curable unsaturated double bonds include maleic acid, fumaric acid, and so forth.

The radiation-curable unsaturated polyester resin can be produced by adding maleic acid, fumaric acid, or the like to at least one polybasic acid component and at least one polyhydric alcohol component, and then subjecting the mixture to a dehydration or dealcoholization reaction in the conventional manner, i.e. at a temperature of from 180° to 200° C. in a nitrogen atmosphere in the presence of a catalyst, thereafter raising the temperature to a range of from 240° to 280° C. whereupon a condensation reaction is effected under a reduced pressure of from 0.5 to 1 mmHg, to obtain a polyester resin. The content of maleic acid, fumaric acid, or the like may be in a range of from 1 to 40 mol %, or preferably from 10 to 30 mol %, in the acid component in view of the degree of cross-linking at the time of its production, the radiation-curability, and so on.

(IV) Polyvinyl Alcohol Type Resins

There may be mentioned polyvinyl alcohol, butyral resins, acetal resins, formal resins, and copolymers of these components.

The hydroxyl groups contained in these resins can be modified to be radiation-sensitive by the process described hereinafter.

(V) Epoxy Type Resins and Phenoxy Resins

There may be mentioned epoxy resins obtained by the reaction of bisphenol A with epichlorohydrin, methylepichlorohydrin or the like, such as EPIKOTE 152, 154, 828, 1001, 1004 and 1007 (manufactured by Shell Chemical Company); DEN431, DER732, DER511 and DER331 (manufactured by Dow Chemical Company); EPICLON-400 and EPICLON-800 (manufactured by Dai-Nippon Ink K.K.); phenoxy resins such as PKHA, PKHC and PKHH which are the highly polymerized resins among the above-mentioned epoxy resins, and are manufactured by Union Carbide Corporation; and copolymers of brominated bisphenol A with epichlorohydrin, such as EPICLON 145, 152, 153 and 1120 (manufactured by Dai-Nippon Ink & Chemicals Co.) and others.

The radiation-sensitive modification is effected by utilization of the epoxy groups contained in these resins.

(VI) Cellulose Derivatives

Cellulose derivatives of various molecular weights are also effective as thermoplastic components. Particularly effective and preferable among these cellulose derivatives are nitrocellulose, cellulose aceto-butylate, ethyl-cellulose, butyl-cellulose, acetyl-cellulose, and so forth.

These cellulose derivatives are modified to radiation-sensitive resins by activating the hydroxyl groups in the resins by the process mentioned hereinafter.

Besides the above, the resins which may also be used effectively for the radiation-sensitive modification are polyfunctional polyester resins, polyether ester resins, polyvinyl pyrrolidone resins and derivatives thereof e.g., PVP olefin copolymers), polyamide resins, polyimide resins, phenol resins, spiro-acetal resins, acrylic resins containing therein at least one acrylic or methacrylic acid ester having a hydroxyl group as the polymerization component, and the like.

Further, by blending a thermoplastic elastomer or prepolymer with the above-described radiation-sensitive, modified thermoplastic resin, it is possible to make the coating film much more tenacious. Furthermore, when such an elastomer or prepolymer is likewise modified to be radiation-sensitive, a better result can be obtained, as will be described hereinbelow.

In the following, there will be given examples of the elastomers and prepolymers which may be combined with the above-described radiation-sensitive resins.

(I) POLYURETHANE ELASTOMERS, PREPOLYMERS AND TELOMERS

The use of polyurethane elastomers is particularly effective in that their abrasion resistance and adhesion to EPT films are satisfactory.

Examples of such effective urethane compounds are: polyurethane elastomers, prepolymers, and telomers which are composed of polycondensates of various polyhydric isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L, Desmodule N, and so on; and various polyesters such as linear saturated polyesters (e.g. those obtained by polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol, and so forth with saturated polybasic acids such as phthalic acid, isophthalic acid, terephthalic acid, maleic acid, succinic acid, adipic acid, sebasic acid, and so forth), linear saturated polyethers (e.g. polyethylene glycol, polypropylene glycol, polytetraethylene glycol, and so forth) as well as caprolactum, hydroxyl-containing acrylic acid esters, hydroxyl-containing methacrylic acid esters, and so forth.

While these elastomers may be combined, as they are, with various radiation-sensitive thermoplastic resins, it will be highly effective to further react these elastomers with a monomer having an acrylic double bond, an allyl-type double bond, or the like which reacts with the terminal isocyanate group or hydroxyl group in the urethane elastomer, to thereby modify the resins to be radiation-sensitive.

(II) Elastomers of Acrylonitrile-butandiene Copolymers

Prepolymers of acrylonitrile-butandiene copolymers containing therein terminal hydroxyl groups, such as "poly BD Liquid Resin" produced by Sinclair Petrochemicals Corp. and available in general market, or elastomers such as "Hycar 1432J" manufactured by Japanese Zeon K.K., and so forth are particularly suitable as the elastomeric components, with which the double bonds in butadiene produce radicals by the radiation rays to cause cross-linking and polymerization.

(III) Polybutadiene Elastomers

Low molecular weight prepolymers having the terminal hydroxyl groups, such as "Poly BD liquid Resin R-15", manufactured by Sinclair Petrochemicals Corp., are particularly suitable in respect of their compatibility with thermoplastic resins. In the "R-15" prepolymer, since the terminal end of the molecule is occupied by the hydroxyl group, it is possible to enhance the radiation sensitivity by adding an acrylic unsaturated double bond to the terminal end of the molecule, whereby the prepolymer becomes much more advantageous as the binder.

Further, cyclized products of polybutadiene such as "CBR-M901" manufactured by Japan Synthetic Rubber Co., also exhibit excellent performance by their combination with the thermoplastic resins. In particular, cyclized polybutadienes are highly efficient in their cross-linking and polymerization by radiation because of the radicals of the unsaturated bonds inherent to polybutadiene. Thus, they have excellent properties as the binder.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K.K.), and elastomers such as epoxy-modified rubbers, or internally plasticized saturated linear polyesters (e.g. "Vylon #300", a product of Toyo Spinning K.K.). These may also be used effectively by subjecting them to the modifying treatment for the radiation-sensitization described hereinbelow.

Now, examples for the syntheses of the radiation-sensitive binders will be given.

PRODUCTION OF TOLYLENE DIISOCYANATE ADDUCT (a) Synthesis of an Acryl-modified Product of a Vinyl Chloride-vinyl Acetate Copolymer Type Resin (Radiation-sensitive Modified Resin)

750 Parts by weight of Vinylite VAGH, 1250 parts by weight of toluene, and 500 parts by weight of cyclohexanone were charged into a four-necked flask of a 5-liter capacity and dissolved under heating. After raising the temperature to 80° C., 61.4 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen ($N_2$) stream until the conversion of NCO reached 90%. After completion of the reaction, the reaction system was cooled and diluted by addition of 1250 parts by weight of methyl ethyl ketone.

PRODUCTION OF 2-HYDROXYETHYL METHACRYLATE (2HEMA) ADDUCT OF TOLYLENE DIISOCYANATE (TDI)

348 Parts by weight of tolylene diisocyanate was heated to a temperature of 80° C. in a four-necked flask of one-liter capacity in a nitrogen (N₂) stream. Thereafter, 260 parts by weight of 2-hexamethylene methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an Acryl-modified Product of a Butyral Resin (Radiation-sensitive Modified Resin)

100 Parts by weight of a butyral resin, "BM-S" produced by Sekisui Chemical Co., was charged into a four-necked flask of a 5-liter capacity, together with 191.2 parts by weight of toluene and 71.4 parts by weight of cyclohexanone, and dissolved under heating. After raising the temperature to 80° C., 7.4 parts by weight of the 2-hydroxyethyl methacrylate adduct of tolylene diisocyanate was added to the solution, followed by further addition of 0.015 part by weight of tin octylate and 0.015 part by weight of hydroquinone. Then, the reaction was carried out at 80° C. in a nitrogen (N₂) stream until the conversion of NCO reached at least 90%. After completion of the reaction, the reaction product was cooled and diluted with methyl ethyl ketone.

(c) Synthesis of an Acryl-modified Product of a Saturated Polyester Resin (Radiation-sensitive Modified Resin)

100 Parts by weight of "Vylon RV-200" manufactured by Toyo Spinning Co., was dissolved under heating in 116 parts by weight of toluene and 116 parts by weight of methyl ethyl ketone. After raising the temperature to 80° C., 3.55 parts by weight of the 2HEMA adduct of TDI was added, followed by further addition of 0.007 part by weight of tin octylate and 0.007 part by weight of hydroquinone. Then, the reaction was carried out at 80° C. in a nitrogen (N₂) stream until the conversion of NCO reached at least 90%.

(d) Synthesis of an Acryl-modified Product of an Epoxy Resin (Radiation-sensitive Modified Resin)

400 Parts by weight of "Epikote 1007" manufactured by Shell Chemical Co., was dissolved under heating in 50 parts by weight of toluene and 50 parts by weight of methyl ethyl ketone. Thereafter, 0.006 part by weight of N,N-dimethylbenzylamine and 0.003 part by weight of hydroquinone were added to the solution, and the temperature was raised to 80° C. Then, 69 parts by weight of acrylic acid was added dropwise, and the reaction was carried out at 80° C. until the acid value became 5 or lower.

(e) Synthesis of an Acryl-modified Product of a Urethane Elastomer (Radiation-sensitive Elastomer)

250 Parts by weight of an isocyanate-terminated diphenylmethane diisocyanate (MDI) type urethane prepolymer, "Nipporan 4040", manufactured by Nippon Polyurethane Industry Co., 32.5 parts by weight of 2HEMA, 0.07 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(f) Synthesis of an Acryl-modified Product of a Polyether Type Terminal Urethane-modified Elastomer (Radiation-sensitive Elastomer)

250 Parts by weight of a polyether, "PTG-500" manufactured by Nippon Polyurethane Industry, 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(g) Synthesis of an Acryl-modified Product of a Polybutadiene Elastomer (Radiation-sensitive Elastomer)

250 Parts by weight of a low molecular weight hydroxyl-terminated polybutadiene, "Poly-BD-Liquid Resin R-15" manufactured by Sinclair Petrochemicals, Inc., 32.5 parts by weight of 2HEMA, 0.007 part by weight of hydroquinone, 0.009 part by weight of tin octylate were charged into a reaction vessel, and dissolved under heating at 80° C. Then, 43.5 parts by weight of TDI was added dropwise, while cooling to control the temperature inside of the reaction vessel to be in a range of from 80° to 90° C. After completion of the dropwise addition, the reaction was conducted at 80° C. until the conversion of NCO reached at least 95%.

Among high-polymer substances, there have been known those which undergo decomposition when irradiated with radiation rays and those which undergo cross-linking among the molecules by the irradiation with radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used as radiation curable coating resins for the backing layer, as they are, i.e. without subjecting them to any particular modifying treatment as mentioned above, since they undergo a cross-linking reaction without such treatment.

Furthermore, according to this method, even a non-solvent type resin can effectively used for the back coating, since it can be cured in a short period of time without requiring any solvent.

As the active energy rays to be used for crosslinking of the backing layer of the present invention, there may be employed electron beams generated from a radiation accelerator as the source of radiation, γ-rays generated from $Co^{60}$ as the source of radiation, β-rays generated from $Sr^{90}$ as the source of radiation, or X-rays generated from an X-ray generator as the source of radiation.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the backing layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

For the curing of the backing layer according to the present invention, a low dose type radiation accelerator (an electron-curtain system) manufactured by Energy Science Co., U.S.A. is extremely advantageous from the viewpoints of its easy introduction into the tape coating process line and the shielding of the secondary X-rays within the accelerator.

Needless to say, it is possible to use a Van de Graaff type accelerator which has so far been used widely as the radiation accelerating apparatus.

Further, for the cross-linking by radiation, it is important to irradiate the backing layer with the radiation rays in an inert gas stream such as nitrogen ($N_2$) gas, helium (He) gas, and so forth. It is extremely disadvantageous to conduct the radiation in the air because $O_3$, etc. generated by the radiation for the cross-linking of the binder components serve to prevent the radicals generated in the polymer from acting advantageously for the cross-linking reaction.

It is therefore important to maintain the atmosphere at a portion where the active energy rays are irradiated to be an inert gas atmosphere such as $N_2$, He or $CO_2$, with the oxygen concentration being as low as 1% at the maximum.

Other useful binder components include acrylic acid, methacrylic acid, acrylamide and methacrylamide as monomers. Various polyesters, polyols or polyurethanes may be modified with a compound having an acrylic double bond to obtain binders containing double bonds. Binders having various molecular weights may be prepared by incorporating polyhydric alcohols and polybasic carboxylic acids, as the case requires. Specific examples of the radiation curable resins given above are only a part of useful radiation curable resins. They may be used in combination as a mixture.

Fillers to be incorporated in the backing layer together with the above-mentioned binder include: (1) graphite and carbon black having electric conductivity; and (2) inorganic fillers such as $SiO_2$, $TiO_2$, $Al_2O_3$, $Cr_2O_3$, SiC, $CaCO_3$, zinc oxide, geothite, $\alpha$-$Fe_2O_3$, talc, kaolin, $CaSO_4$, boron nitride, Teflon powder, graphite fluoride and molybdenum disulfide. The amount of such fillers to be incorporated should appropriately be from 20 to 100 parts by weight relative to 100 parts by weight of the binder in the case of the electrically conductive fillers (1), and from 10 to 300 parts by weight in the case of the inorganic fillers (2). When the amount of the fillers is too large, there will be disadvantages such that the coating film becomes brittle and the number of dropouts increases.

The magnetic tapes to be provided with such a backing layer include audio tapes, video tapes, tapes for computers, endless tapes and magnetic disks. Such a backing layer is effective particularly when provided on the video tapes and the tapes for computer use, where the dropout constitutes one of the critical characteristics thereof.

Now, the present invention will be described in further detail with reference to Examples. However, it should be understood that the present invention is by no means restricted by these specific Examples.

Magnetic Layer 1

Various alloy powders were prepared by a wet-reducing method. These powders were composed of acicular particles having an axial ratio (i.e. short axis/long axis) of from 1/5 to 1/10, and having a residual magnetic flux density of from 2000 to 3000 gauss, a coercive force of from 1000 to 2000 Oe and a BET specific surface area of from 45 to 70 $m^2/g$. Each of these magnetic powders was mixed with other components in the following mixing ratio by a usual method.

|  | Parts by weight |
| --- | --- |
| Fe—Co—Ni alloy powder | 100 |
| Vinyl chloride-vinyl acetate-vinyl alcohol copolymer (VAGH manufactured by U.C.C. Co., U.S.A) | 15 |
| Polyurethane prepolymer (Desmodule 22 manufactured by Bayer AG) | 10 |
| Methyl ethyl ketone/toluene (1/1) | 250 |
| Myristic acid | 2 |
| Sorbitol stearate | 2 |

To the mixture thus obtained, 30 parts by weight of a polyisocyanate (Desmodule L manufactured by Bayer AG) was added to obtain a magnetic coating material. The coating material was coated on a polyester film in a thickness of 3.5 $\mu$m, and subjected to calender treatment.

Magnetic Layer 2

By using the same magnetic alloy powder and base material as used for the magnetic layer 1, a mixture having the following composition was coated on a polyester film in a thickness of 3.5 $\mu$m, and subjected to electron beam curing and calender treatment:

|  | Parts by weight |
| --- | --- |
| Fe—Co—Ni alloy powder | 100 |
| Vinyl chloride-vinyl acetate-vinyl alcohol copolymer (VAGH) | 5 |
| Polyvinyl butyral resin (b) | 10 |
| Acrylic double bond-containing urethane (e) | 10 |
| Methyl ethyl ketone/toluene (50/50) | 250 |

Magnetic Layer 3

A magnetic recording medium was prepared in the same manner as the preparation of the magnetic layer 2 by using a mixture having the following composition:

|  | Parts by weight |
| --- | --- |
| Fe—Co—Ni alloy powder | 100 |
| Saturated polyester resin | 5 |
| Acrylic double bond-containing vinyl chloride-alcohol copolymer (a) (Degree of polymerization: 300) | 10 |
| Acrylic double bond-containing polyether urethane elastomer (f) | 10 |
| Solvent mixture | 250 |

EXAMPLE 1

| | Parts by weight |
|---|---|
| Carbon black (81 mμm) | 50 |
| Acryl-modified vinyl chloride-vinyl acetate-vinyl alcohol copolymer (a) (Prepared by Synthesis (a)) | 30 |
| Acryl-modified polyurethane elastomer (e) | 20 |
| Solvent mixture (MIBK/toluene = 1/1) | 300 |

The mixture having the above composition was dispersed in a ball mill for five hours, and the dispersed mixture was coated on the rear surface of the polyester film, on which a magnetic layer had already been formed, in such a manner that the thickness of the backing layer upon drying would be 1.5 μm. Then, this backing layer was irradiated with and cured by electron beams in a nitrogen (N₂) gas by means of an electron curtain type electron beam accelerator at an accelerating voltage of 150 KV, at an electrode current of 10 mA, and at an absorption dose of 10 Mrad. Then, the coated film was calendered and wound up on a reel, and cut into a video-tape with a width of ½ inch.

EXAMPLE 2

| | Parts by weight |
|---|---|
| Al₂O₃ (particle size: 200 mμm) | 50 |
| Acryl-modified vinyl chloride-vinyl acetate-vinyl alcohol copolymer (a) | 30 |
| Acryl-modified polyurethane elastomer (e) | 20 |
| Solvent mixture | 300 |

The mixture having the above composition was processed in the same manner as in Example 1.

EXAMPLE 3

| | Parts by weight |
|---|---|
| Carbon black (81 mμm) | 25 |
| CaCO₃ (40 mμm) | 25 |
| Acryl-modified polyurethane elastomer (e) | 30 |
| Vinyl chloride-vinyl acetate-vinyl alcohol copolymer (VAGH manufactured by U.C.C.) | 70 |
| Solvent mixture | 300 |

The mixture having the above composition was processed in the same manner as in Example 1.

Magnetic recording media were prepared by various combinations of the magnetic layers 1, 2 and 3 with the backing layers of Examples 1, 2 and 3 and Comparative Example 1 in a different order for the formation of the respective layers. Calender treatment was applied every time when each layer was formed. The results thereby obtained are shown in Table 1. In the Table, (1) and (2) indicate the order of the formation of the layers.

TABLE 1

| | Magnetic layer | Backing layer | Abrasion of the backing layer | Cinching | Abrasion of the magnetic layer | Dropouts | Y-S/N (dB) Outside | Y-S/N (dB) Inside |
|---|---|---|---|---|---|---|---|---|
| A | (1) Magnetic layer 1 | (2) Example 1 | ⊙ | ⊙ | ⊙ | 80 | +0.2 | −0.6 |
| B | (2) Magnetic layer 1 | (1) Example 1 | ⊙ | ⊙ | ⊙ | 80 | +0.2 | −0.2 |
| C | (2) Magnetic layer 1 | (1) Example 2 | ⊙ | ⊙ | O | 80 | +0.3 | −0.2 |
| D 1 | (1) Magnetic layer 2 | (2) Example 2 | ⊙ | ⊙ | O | 30 | +0.6 | +0.6 |
| | (2) Magnetic layer 2 | (1) Example 2 | ⊙ | ⊙ | O | 30 | +0.6 | +0.6 |
| | (1) Magnetic layer 3 | (2) Example 3 | ⊙ | ⊙ | ⊙ | 30 | +0.6 | +0.6 |
| | (2) Magnetic layer 3 | (1) Example 3 | ⊙ | ⊙ | ⊙ | 30 | +0.6 | +0.6 |
| Comparative Example | (1) Magnetic layer 1 | (2) Resin of magnetic layer 1 except that the pigment of Example 3 was used | Δ | ⊙ | ⊙ | 550 | 0 | −5.0 |

Note:
⊙ Excellent,
O Good,
Δ Fair,
X No good

STUDY OF THE RESULTS

Figure 1:
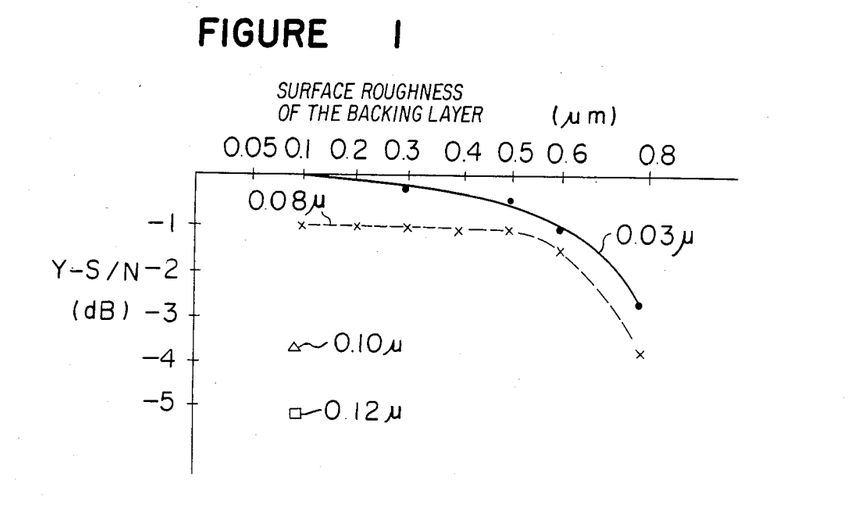
FIG. 1 is a graph illustrating the relationship between the S/N ratio and the surface roughness of the magnetic and backing layers of the magnetic recording medium.

The surface roughness of the video tapes (i.e. the portions of the tapes where the tighting of the tape windings was minimum) obtained in Example 1 was studied. FIG. 1 shows the S/N ratios (relative values) in the case where the video tapes were driven at a speed of 3.8 m/sec, and the recording and reproduction were conducted with a major frequency of 4.5 MHz. The numerical values alloted to the curves indicate the surface roughness. As is evident from the Figure, the S/N ratio can be kept at a high level when the surface roughness of the magnetic layer is at most 0.08 μm, and the surface roughness of the backing layer is at most 0.6 μm. The same was true also with respect to Examples 2 and 3.

Then, from the study of the running friction, it was found that the friction was great when the surface roughness of the backing layer was less than 0.05 μm.

Figure 2:
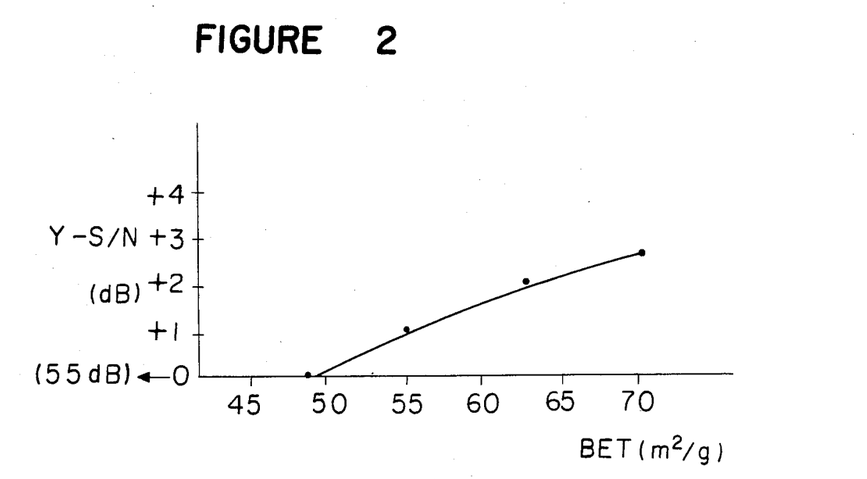
FIG. 2 is a graph illustrating the relationship between the S/N ratio and the BET specific surface area of the alloy magnetic powder.

In Example 1, the relation between the BET specific surface area of the alloy powder and the S/N ratio was investigated with respect to the video tapes wherein the surface roughness of the magnetic layer was at most 0.08 μm and the surface roughness of the backing layer was within a range of from 0.05 to 0.6 μm, whereby the results as shown in FIG. 2 were obtained. However, 55 dB was employed as the reference. From FIG. 2, it is apparent that excellent characteristics are obtainable when the BET value is at least 48 m$^2$/g. The same was true also in the case of other Examples.

It was further found that the cinching phenomenon, the adhesion and the abrasion could be reduced when each surface roughness was within the above-mentioned range.

Further, the tightening of the tape winding was measured. Satisfactory results were obtained in all cases at 40° C. and at a relative humidity of 80%. Under a high temperature high humidity condition (50° C., relative humidity of 80%), the abrasion of the backing surface was greater in the case of the thermosetting type than in the case of the radiation curable type, although with respect to the cinching, satisfactory results were obtained in all cases including the Comparative Example. This is attributable to the fact that the radiation curable type binder gives a tougher coating film than the thermosetting type binder. With respect to the dropouts, better results are obtainable in the case of the radiation curable type than in the case of the thermosetting type, since no transfer of the backing layer takes place. Consequently, the output is increased. It is more advantageous that both the magnetic layer and the backing layer are cured by radiation. From the comparison of the tapes A and B in the Table 1, it will be seen that in the case of B, the thin base is reinforced by the backing layer, whereby the Young's modulus increases, and the adverse effect due to the tightening of the tape winding can better be avoided than in the case of A. Further, in the case of the tape D, since the curing is conducted during the continuous running, there is no adverse of the tightening of the tape winding. Further, by the incorporation of a fatty acid (in some cases a fatty acid ester), for instance, by the addition of 3 parts by weight thereof to Example D-1, it is possible to prevent the occurrence of jitter which creates a problem for the image. This may be attributable to the fact that the frictional coefficient decreased to 0.15 from the initial value of 0.22 before the addition, and the running property was improved.

Figure 3:
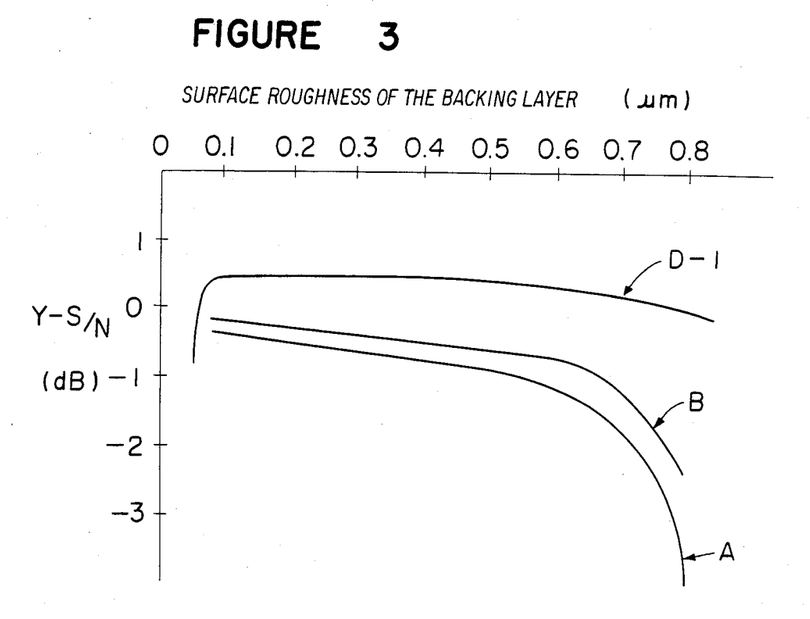
FIG. 3 is a graph illustrating the characteristics of the tape at the inside portion of the roll.
Figure 4:
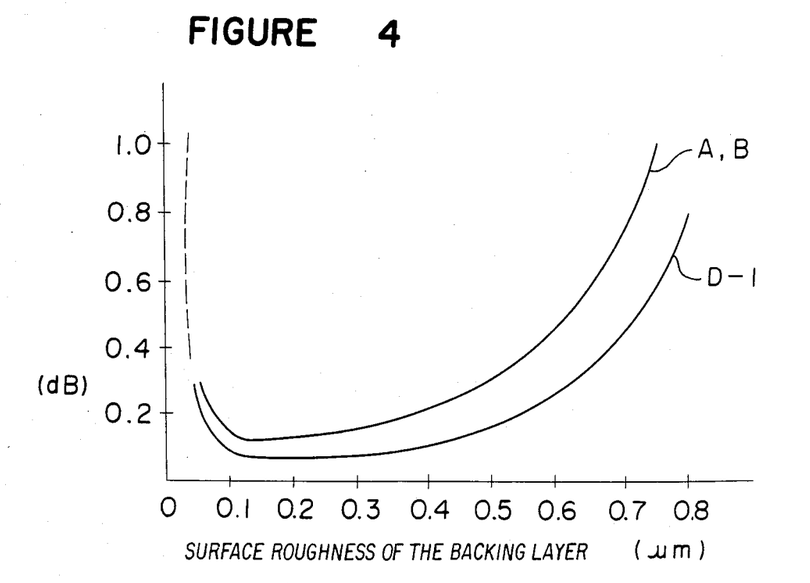
FIG. 4 is a graph illustrating the variation in the output of the tape at the inside portion of the roll.

Now, referring to FIGS. 3 and 4 illustrating the influences of the surface roughness of the backing layers of tapes A, B and D-1 taken from the inner most portions of the respective rolled tapes, over Y-S/N (dB) and the output variation (dB), respectively, it will be seen that when the surface roughness exceeds 0.6 μm, Y-S/N of the tapes is lower by at least 1.0 dB in the output as compared with the respective tapes having good surface roughness, and there is a substantial variation in the output in the direction of the tape running i.e. in the longitudinal direction of the respective tapes. Further, when the surface roughness is less than 0.05 μm, the output variation tends to exceeds 1.5 dB, such being undesirable. Thus, the influence of the surface roughness is pronounced coupled with the tightening of the tape winding. From the comparison of A, B and D-1, it is seen that the decrease in Y-S/N is less in B and D-1 than in A, and that D-1 is superior to B in that no transfer of the roughness of the backing layer surface to the magnetic layer takes place and accordingly the influence of the roughness of the backing layer is minimum. Thus, it is possible to minimize the influence of the tightening of the tape winding by properly selecting the surface roughness.

The various characteristics were measured or evaluated as follows:

1. Frictional Coefficient

A magnetic tape was put around a polished aluminum cylinder having a diameter of 4 mm at an angle of 180° so that the backing layer is located inside, and permitted to run at a speed of 2 cm/sec, whereby the tensions at the dispensing side and at the winding-up side were measured, and the frictional coefficient was obtained by calculation from the measured values.

2. Cinching Phenomenon

By means of a commercially available VHS system VTR, a tape was fast forwarded for its entire length, then fast rewound, stopped at a point where 50 m remains, and then again fast rewound to the end. Then, the winding of the tape was visually examined. Good winding where no space was observed in the tape winding, was evaluated as "Good", and inferior winding where a space was observed in the tape winding, was evaluated as "No good".

3. Abrasion of the Backing Layer

By means of a commercially available VHS system VTR, a tape was permitted to run 100 times at 40° C. under a relative humidity of 80%, whereupon the stain in the cassette case was examined. The case where a stain was observed, was evaluated as "No good", and the case where no stain was observed, was evaluated as "Good".

4. Adhesion of the Magnetic Layer with the Backing Layer

A tape was wound up on a VHS reel, and left to stand at 60° C. for 5 days, whereupon the adhesion was visually evaluated. The case where no adhesion was observed, was evaluated as "Good", and the case where adhesion was observed, was evaluated as "No good".

5. Surface Roughness

The surface roughness was obtained by 20 point average method from the chart obtained by means of Tallistep (manufactured by Taylor-Hobson Co.). A cut off of 0.17 mm, a needle pressure of 2 mg and a needle of 0.1×2.5 μm were employed.

6. Tightening of the Tape Winding

A rolled tape having a length of 250 m was kept at 50° C. at a relative humidity of 80% for 7 days. Then, the surface roughness and Y-S/N of the magnetic layer were measured.

What is claimed is:

1. A magnetic recording medium which comprises a plastic base film and a magnetic layer formed on one side of the base film and composed of a ferromagnetic alloy powder dispersed in a resin binder, characterized in that said ferromagnetic alloy powder has a surface area of at least 48 m$^2$/g as measured by BET method, said magnetic layer has a coercive force of at least 1,000 Oe and a surface roughness of at most 0.08 μm, and a radiation-cured backing layer made of a radiation sensitive resin and having a surface roughness of from 0.05 to 0.6 μm is formed on the other side of the base film.

2. The magnetic recording medium according to claim 1, wherein the radiation sensitive resin is a resin having a radiation curable double bond selected from the group consisting of an acrylic double bond, a maleic double bond and an allyl-type double bond.

* * * * *